M. H. HANSEN.
WEIGHING SCALE.
APPLICATION FILED NOV. 4, 1915.
1,223,787.   Patented Apr. 24, 1917.
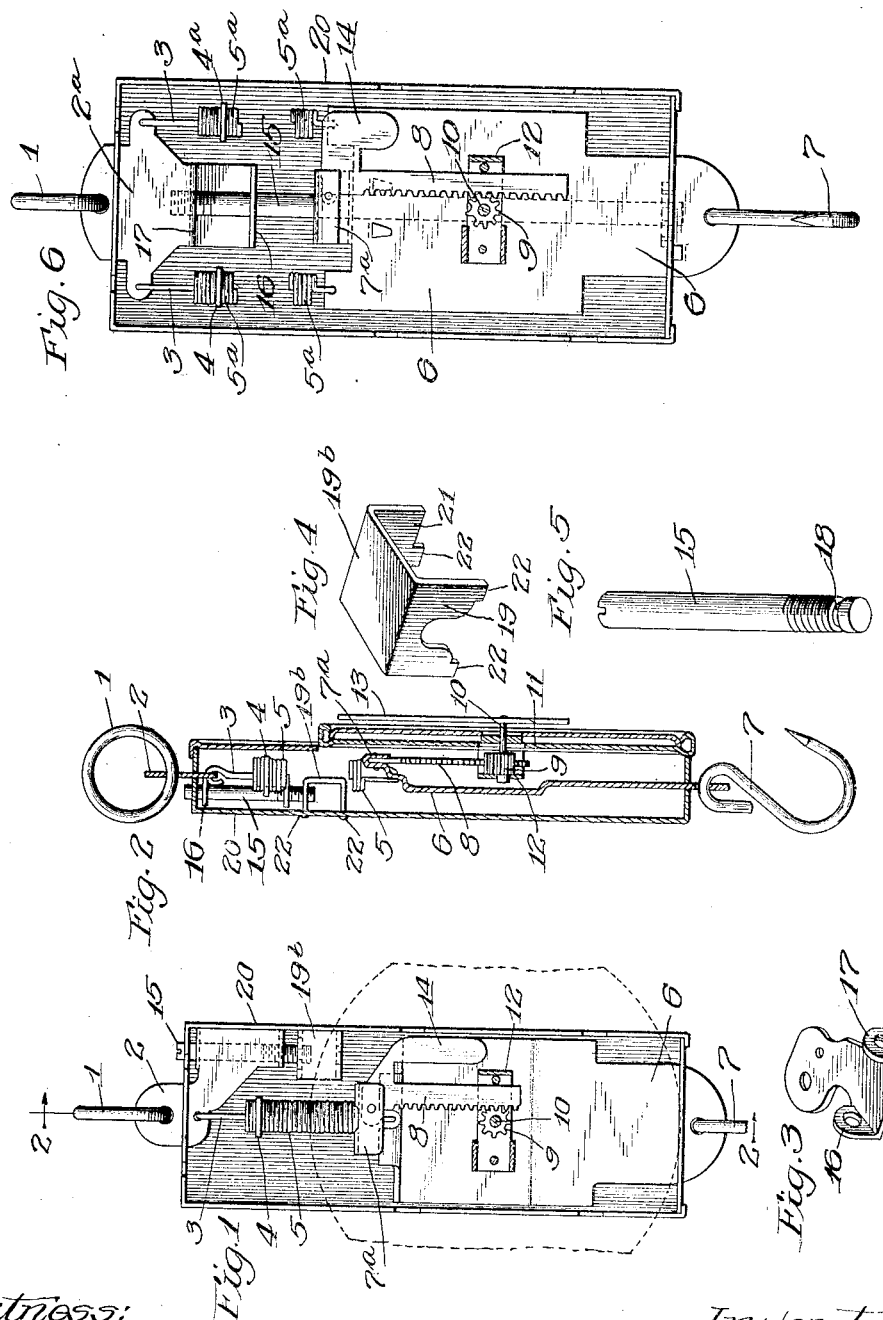

UNITED STATES PATENT OFFICE.

MARIUS H. HANSEN, OF CHICAGO, ILLINOIS.

WEIGHING-SCALE.

1,223,787.  Specification of Letters Patent.  Patented Apr. 24, 1917.

Application filed November 4, 1915. Serial No. 59,596.

*To all whom it may concern:*

Be it known that I, MARIUS H. HANSEN, a citizen of the United States, residing in Chicago, in the county of Cook and State of Illinois, have invented certain new and useful Improvements in Weighing-Scales, of which the following is a specification.

The present invention relates to weighing scales of the suspension-spring type. In suspension-spring scales as heretofore constructed, the hanger, usually a ring or an equivalent device, engages a lug or an equivalent device on the top of the casing; the load-spring has its upper end connected to the top of the casing and its lower end connected to the upper end of a part that may appropriately be called a draw-bar, load-bar, or load plate (being usually formed of a metal plate), the lower end of which carries a hook or other device to which the load is applied through any suitable device, or devices, and to this draw bar is pivoted a rack bar which engages a pinion on the shaft of the pointer, which shaft is in turn supported by the casing—or by the dial which in turn is supported by the casing. In a suspension scale thus constructed the casing forms a part of the load mechanism in that the load is supported by it and the setting or adjusting of the pointer is accomplished by an exposed easily accessible thumb-nut which bears upon the top of the casing and is turned onto a screw which extends through an opening in the top of the casing and has its lower end connected to the load spring.

In such a scale, as before intimated, the casing is a part of the load mechanism and supports the other parts, while according to the present invention the load mechanism supports the casing, leaving the latter no function to perform save that of inclosing and thereby concealing and protecting the load mechanism and aiding, incidentally, in the setting or adjusting of the hand or pointer.

The exposed easily accessible adjusting nut is objectionable because of the ease and facility with which it may be reached and tampered with and the adjustment of the scale fraudulently changed. It is therefore obnoxious to the laws of some States or municipalities which require that the adjusting device for setting the scale be of such nature that a tool or implement is necessary for its manipulation.

Hence, one object of the present invention is to provide a suspension-spring scale in which the casing forms no part of the load mechanism but is simply supported thereby so as to conceal and protect it.

Another object of the invention is to provide adjusting mechanism of improved construction which requires a tool or implement for its manipulation.

With these objects in view the present invention consists in the features of novelty that are hereinafter described with reference to the accompanying drawing, which is made a part of this specification, and in which:

Figure 1 is a front elevation of a scale embodying the generic features of the invention and with the dial and the front plate of the casing omitted, the position of the dial being indicated by dotted lines and the plane of the section being indicated by the line 1—1, Fig. 2, looking in the direction of the arrows.

Fig. 2 is a sectional elevation thereof on a plane perpendicular to the cutting plane of the section of Fig. 1, the plane of the section of Fig. 2 being indicated by the line 2—2, Fig. 1, and the parts being viewed in the direction of the arrows.

Figs. 3, 4 and 5 are perspective views of as many different parts of the scale.

Fig. 6 is a view similar to Fig. 1, showing a modification.

The so-called hanger which is shown in the drawing as consisting of a ring is shown at 1. It will be understood that this ring is suspended by any suitable device. The hanger, 1, engages a part, 2, hereinafter called the load head. This load head is made of plate metal; it is a part of the load mechanism and to it is connected the upper end of a suspension rod, 3, the lower end of which engages a washer, 4, which in turn engages one of the upper convolutions of the load spring, 5, in such manner that the washer may be adjusted up or down to regulate the length and therefore the tension of the active portion of the load spring. The lower end of the load spring engages the upper end of the so-called draw bar or load bar, 6, the lower end of which suspends a hook, 7, to which the load is applied by any suitable means, as, for example, by a pan, scoop, or other device (not shown.) Or the hook alone may be used.

It is manifest that when a load is applied to the hook, 7, it will draw downward the load bar, 6, in opposition to the resistance of the load spring, 5, the extent or distance to which the load spring 5 is distended being exactly proportional to the weight applied to the hook, 7. This relation is established by the proper adjustment of the washer, 4, in the well-known manner. The load-bar, 6, has at its upper end a portion, 7ª, of inverted U-shape, and to this inverted portion is pivoted the upper end of a rack bar, 8, which engages a pinion, 9, rigidly secured to a shaft, 10, which is journaled in and supported by the dial, 11, and a bridge piece, 12, which is rigidly secured to the back of the dial so that when the load-bar, 6, is moved downward the rack bar, 8, will cause the pinion, 9, to rotate clockwise and carry with it the pointer, 13, which is rigidly secured to the shaft, 10. The rack bar is held normally in engagement with the pinion, 9, by a weight, 14, which is formed integrally with the rack bar.

As above intimated the initial adjustment of the scale so that the pointer, 13, stands at zero when no load is on the hook, 7, is accomplished by adjusting the washer, 4, upward or downward as may be necessary. After this first adjustment is accomplished it may become necessary to again adjust or re-set the scale so that the pointer stands at zero at the commencement of the weighing operation. This may be necessitated by any one of a number of causes. This re-adjustment or re-setting is accomplished by a screw, 15, which passes through ears, 16 and 17, of the part, 2, and has threaded engagement with one of said ears,—say the ear, 17. The lower portion of this screw is provided with a circumferential groove, 18, which is straddled by a notched plate, 19, permanently secured to the back of the casing, 20. This plate is preferably in the form of a flange of a substantially U-shaped part, which is shown in the perspective view, Fig. 4. The two flanges, 19 and 21, of this U-shaped part are provided with lugs, 22, which pass through perforations in the back of the casing, 20, and are up-set or riveted as shown in Fig. 2. For the purpose of making a permanent firm connection between the plate 19 and the back of the casing, 20, the upper end of the screw 15 is notched or otherwise shaped to receive a screw driver or other turning implement for turning it, so that the screw cannot be fraudulently manipulated by hand.

In the above described form of the invention the scale has only a single load spring, 5, which is located directly in the line of strain between the hanger, 1, and the hook, 7, but in the form of the invention shown in Fig. 6, two load springs, 5ª are used, said load springs being arranged at equal distances from said central line of strain passing from the hanger, 1, to the hook, 7, and in this form of the invention the load head, 2ª, extends equal distances upon opposite sides of said central line of strain. This form of the invention has certain advantages over that shown in Figs. 1 and 2, and is made the subject of a separate application of even date herewith.

Similar parts in both forms of the invention are indicated by similar reference numerals.

All of the details of the construction of that form of the invention which is shown in Fig. 6 need not be herein fully described, as they are fully described in the aforesaid companion application of even date herewith. The object of the present application is to cover the generic features of the invention and the specific embodiment thereof which is shown in Figs. 1 and 2.

It will be understood that in both forms of the invention the casing is provided with a slot through which the load head passes freely so that it may be moved up and down freely relatively to the casing by turning the adjusting screw 15, which is swiveled to the casing.

In the form of the invention shown in Fig. 6 the adjusting screw engages the load head, 2ª, and passes downward completely through the casing, 20, and through an opening in the bottom thereof, its lower end being notched or provided with some other feature for receiving a screw-driver or some other implement for turning it. Its upper end has threaded engagement with the load-head, 2ª, so that by turning the screw the load-head is moved upward or downward relatively to the casing. This action is true of both forms of the invention and the result of it is the bodily raising or lowering of the rack-bar relatively to the casing, 20, and since the pinion, 9, occupies a fixed relation to the casing, it follows that by thus raising or lowering the neck bar the pinion will be turned in one direction or the other, and the pointer thereby moved in one direction or the other, to properly set the scale.

As above intimated the adjustment of the scale, i. e. the conditioning of the parts so that a given unit of load and therefore a corresponding distention of the load spring will produce a corresponding distance of movement of the pointer is accomplished by lengthening or shortening the operative portion of the load spring in the initial adjustment of the scale, and this, in turn is accomplished by moving the so-called washer toward or from the upper end of the load spring in the manner fully described in the patent heretofore granted to me.

The present invention does not contemplate the regulation or alteration of this adjustment of the tension of the load spring, but contemplates only the setting of the pointer with relation to the dial so that the pointer may be set at zero when the load mechanism is properly adjusted to respond unit for unit to the load put upon it; hence, according to the present invention the tension of the load spring is not altered but the spring is moved bodily to cause a corresponding movement of the pointer.

It will, therefore, be seen that in both forms of the invention there is a load mechanism, a casing carrying the pinion of the pointer, and a setting screw swiveled to one of these parts and having threaded engagement with the other so that upon turning the screw the parts will be moved relatively to each other, and this is the gist of this feature of the present invention.

In both forms of the invention it will be seen that the setting screw has a swivel connection with the casing and a threaded engagement with the so-called load-head, but manifestly a reversal of this arrangement, i. e. a threaded engagement with the casing and a swivel engagement with the load-head would be within the scope of the present invention.

What I claim as new is:

1. In a scale the combination of a casing having through its top an elongated opening, or slot, load mechanism independent of the casing, said load mechanism having a plate metal load head occupying and adapted to move freely through said opening of the casing, a draw bar and a load spring, the upper and lower ends of the load spring being connected to said load-head and draw bar, respectively, a rack bar carried by the load mechanism, a pinion supported by the casing and engaged by said rack bar, a pointer, means for operatively connecting said pinion and pointer and adjustable setting mechanism engaging the casing and load mechanism for moving the load mechanism bodily relatively to the casing.

2. In a scale the combination of a casing having through its top an elongated opening, a load head, made of plate metal, extending through said opening, free of the casing, and freely movable therein, adjustable means connecting the load-head and casing, a load spring, a draw bar, the upper end of which is connected to the lower end of the load spring, a rack bar carried by the draw bar, a pinion carried by the casing, and a pointer operatively connected with said pinion.

3. In a scale the combination of a casing having an opening through the top thereof, a load-head extending through said opening, a hanger engaging said load-head, a set screw having threaded engagement with the load-head, a swivel connection between said screw and the casing, a load spring, the upper end of which is connected with the load-head, a draw bar, the upper end of which is connected to the lower end of the load spring, a rack bar carried by said draw bar and a pinion engaged by said rack bar and supported by the casing.

4. In a scale the combination of a casing having an opening through the top thereof, a load-head extending through said opening, a suspension-device engaging said load-head above the top of the casing, a load spring, a rod connecting the upper portion of the load spring with the load-head in the line of strain, a draw bar, the upper end of which is connected with the lower end of the load spring, the bottom of the casing having a second opening through which said draw bar extends, a rack bar carried by the draw bar, a pinion with which said rack bar engages, a shaft carrying said pinion and supported by the casing, a pointer carried by said shaft, a setting screw having threaded engagement with the load-head and means providing a swivel connection between said setting screw and the casing.

MARIUS H. HANSEN.

Witnesses:
L. M. HOPKINS,
L. F. KINNUCAN.

Copies of this patent may be obtained for five cents each, by addressing the "Commissioner of Patents, Washington, D. C."